US010324455B2

(12) United States Patent
Elazary et al.

(10) Patent No.: US 10,324,455 B2
(45) Date of Patent: *Jun. 18, 2019

(54) AUTONOMOUS COORDINATION OF RESOURCES AMONGST ROBOTS

(71) Applicant: inVia Robotics, Inc., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/369,435

(22) Filed: Dec. 5, 2016

(65) Prior Publication Data

US 2017/0308070 A1    Oct. 26, 2017

Related U.S. Application Data

(63) Continuation of application No. 15/137,463, filed on Apr. 25, 2016, now Pat. No. 9,513,627.

(51) Int. Cl.
*G05B 19/418* (2006.01)
*G05D 1/00* (2006.01)
*G05D 1/02* (2006.01)

(52) U.S. Cl.
CPC . *G05B 19/41865* (2013.01); *G05B 19/41895* (2013.01); *G05D 1/0027* (2013.01);
(Continued)

(58) Field of Classification Search
CPC .......... G05B 19/4061; G05B 19/41815; G05B 19/41865; G05B 19/41895;
(Continued)

(56) References Cited

U.S. PATENT DOCUMENTS 9,676,097 B1 *   6/2017   Gallagher ................ B25J 9/161
2010/0316470 A1 * 12/2010   Lert ....................... B65G 1/045
                                                        414/273
(Continued)

*Primary Examiner* — Spencer D Patton
(74) *Attorney, Agent, or Firm* — Ansari Katiraei LLP; Arman Katiraei; Sadiq Ansari

(57) ABSTRACT

A synchronization primitive provides robots with locks, monitors, semaphores, or other mechanisms for reserving temporary access to a shared limited set of resources required by the robots in performing different tasks. Through non-conflicting establishment of the synchronization primitives across the set of resources, robots can prioritize the order with which assigned tasks are completed and minimize wait times for resources needed to complete each of the assigned tasks, thereby maximizing the number of tasks simultaneously executed by the robots and optimizing task completion. The synchronization primitives and resulting resource allocation can be implemented with a centralized coordinator or with peer-to-peer robotic messaging, whereby private keys and blockchains secure the precedence and establishment of synchronization primitives by different robots. Moreover, synchronization primitives can be established with queues to further optimize the immediate and future allocation of resources to different robots.

17 Claims, 11 Drawing Sheets

(52) U.S. Cl.
CPC ......... *G05D 1/0234* (2013.01); *G05D 1/0289* (2013.01); *G05B 2219/39146* (2013.01); *G05B 2219/39166* (2013.01); *G05B 2219/39167* (2013.01); *G05D 2201/0216* (2013.01)

(58) Field of Classification Search
CPC ........... G05B 2219/39146; G05B 2219/39166; G05B 2219/39167; G05B 2219/39169; G05D 2201/0216; G05D 2201/0209; G05D 2201/0212; G05D 2201/0213; G05D 1/0027; G05D 1/0276; G05D 1/0287; G05D 1/0289; G08G 1/169; G08G 1/161; G08G 1/164; G08G 1/20
See application file for complete search history.

(56) References Cited

U.S. PATENT DOCUMENTS

2014/0350831 A1* 11/2014 Hoffman ................ G06Q 10/00
                                                              701/117
2016/0059411 A1*  3/2016 Richter .................... B25J 9/162
                                                              701/23

\* cited by examiner

AUTONOMOUS COORDINATION OF RESOURCES AMONGST ROBOTS

CLAIM OF BENEFIT TO RELATED APPLICATIONS

This application is a continuation of U.S. nonprovisional application Ser. No. 15/137,463 entitled "Autonomous Coordination of Resource Amongst Robots", filed Apr. 25, 2016. The contents of application Ser. No. 15/137,463 are hereby incorporated by reference

BACKGROUND INFORMATION

Collision detection and avoidance has expanded robot autonomy by allowing robots to move in three dimensional space. Robots can detect and avoid obstacles in their path while also finding and interacting with items of interest. The expanded autonomy has increased the functionality and roles of robots. One such example is the use of robots to navigate within a warehouse in order to retrieve items distributed throughout the warehouse.

Collision detection and avoidance is a form of local navigation. Robots independently identify obstacles and independently perform actions to avoid the obstacles. Such local navigational techniques are sufficient for robots navigating in a space with stationary obstacles. Inefficiencies and even deadlocks can arise however when local navigational techniques fully control robot movements in a space with transitory obstacles. In particular, inefficiencies and deadlocks can be seen when the local navigational techniques fully control movements of several robots operating in the same space. The inefficiencies and deadlocks stem from the lack of coordinated movement between the robots and the inability of the robots to communicate in order to establish movement precedence. For example, a first robot locally navigating away from a collision can create a ripple effect whereby the first robot moves into the path of a second robot, creating one or more new collisions that both the first and second robots attempt to avoid, which in turn cascades the effect and creates additional obstacles with other robots.

Generally, the same issues arise whenever two or more robots require the same resource and the robots operate independently and autonomously. The sought after resource can include anything including tangible and intangible resources. Tangible assets include physical items, locations (e.g., space, charging stations, etc.), and components. Intangible assets can include shared computing resources, shared communication channels, and time as some examples.

There is a therefore a need to optimize access to limited resources for robots operating in the same space. The optimized access will allow the robots to move more efficiently within a common space as well as perform designated tasks more efficiently. In particular, the optimized access prioritizes the resource allocation to minimize aggregate time robots wait in order to obtain the resources needed to move or perform a task. To this end, there is a need to coordinate the resource allocation and reservation amongst robots. There is a further need to have the robots coordinate the resource allocation and reservation autonomously without human intervention so that the resources can be efficiently allocated in real-time. Accordingly, there is a need to supplement local navigational techniques with global navigational techniques and independent and autonomous robot operation through coordinated resource allocation.

BRIEF DESCRIPTION OF THE DRAWINGS

A preferred embodiment for autonomous coordination of resources amongst robots will now be described, by way of example only, with reference to the accompanying drawings in which.

DETAILED DESCRIPTION OF PREFERRED EMBODIMENTS

Figure 1:
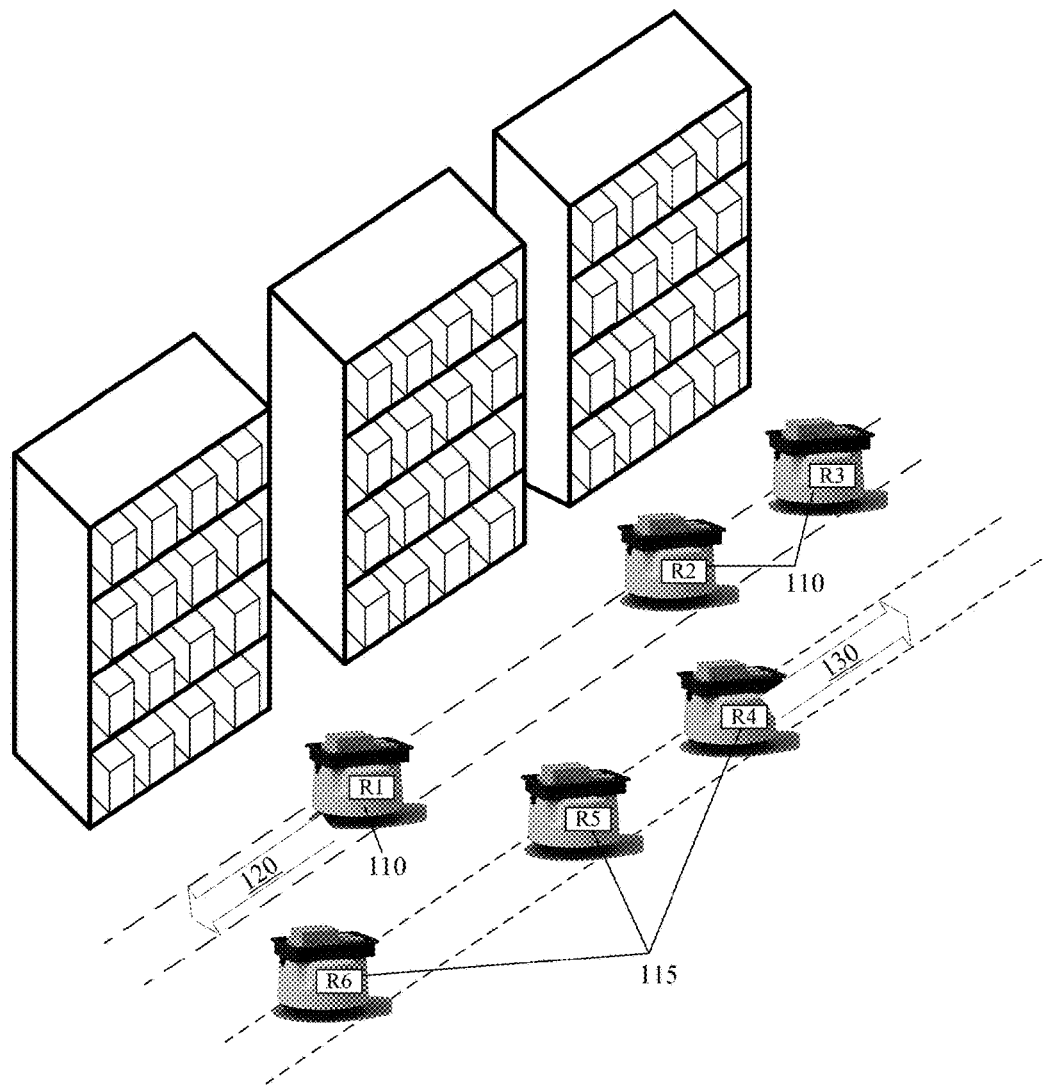
FIG. 1 conceptually illustrates the modified robot operation resulting in the autonomous coordinated movement of multiple robots in accordance with some embodiments.

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which autonomous coordination of resources amongst robots can be practiced. It is to be understood that other embodiments can be used and structural changes can be made without departing from the scope of the embodiments herein described.

The embodiments provide synchronization primitives with which independently and autonomously operated robots coordinate and control access to a limited set of shared resources required by the robots in performing different tasks. The shared resources are available for use by all robots and the synchronization primitives allow the robots to temporality reserve different resources for exclusive and guaranteed, immediate or future access to those resources. Using the synchronization primitives, robots prioritize the order with which assigned tasks are completed and minimize wait times for resources needed to complete each of the assigned tasks, thereby maximizing the number of tasks simultaneously executed by the robots and optimizing task completion.

In some embodiments, the synchronization primitive is a lock, monitor, semaphore, or other mechanism for reserving temporary access to a resource. The synchronization primitive enables atomic transactions and guarantees that no two entities have access to the resource at the same time.

Some embodiments establish a resource queue in which synchronization primitives from different robots can be entered for ordered or future reservation of a corresponding resource. In other words, the synchronization primitive can be issued with respect to a particular resource with a time, wherein the time specifies the reservation duration or future time for reserving the resource.

The synchronization primitive provides notification regarding resource availability. For instance, when a first robot attempts to reserve a resource already reserved by a second robot, the first robot will be identify the synchronization primitive of the second robot already associated with the resource.

The synchronization primitive is resource agnostic. Robots can use the synchronization primitive to coordinate control and access to any number of different tangible and intangible resources in real-time including three dimensional space, computational resources, and authentication privileges as some examples.

Some embodiments modify robot operation to form lanes and to leverage the synchronization primitive for coordinating and controlling movements relative to other robots while moving within the lanes. Coordinating and controlling the movement of robots with the lanes and synchronization primitives of some embodiments eliminates the potential for deadlock, minimizes the number of robot-to-robot collisions, and further minimizes the number of navigational adjustments robots make in moving from one location to another. In this manner, the embodiments enable multiple robots to move more efficiently within the same space.

FIG. 1 conceptually illustrates the modified robot operation resulting in the autonomous coordinated movement of multiple robots in accordance with some embodiments. The figure depicts multiple robots 110 and 115 operating within a common space. In this figure, the common space includes an aisle formed by a series of shelves that contain different items.

As noted above, the modified robot operation coordinates the movement of different robots 110 and 115 in the same space using different lanes 120 and 130. In particular, robots 110 traveling in a first direction down the aisle stay in a first lane 120, while robots 115 traveling in an opposite second direction up the aisle stay in a different second lane 130. The lanes 120 and 130 keep the robots 110 and 115 traveling in opposite directions from colliding or otherwise coming into contact with one another. The lanes 120 and 130 and modified robot operation to use the lanes are part of an overall global navigational methodology for autonomously coordinating the movement of multiple robots operating within the same space.

There are however instances where robots stop their movement and are temporarily stationary within a given lane. A first scenario is when a robot in the closer first lane retrieves an item from a shelf. The robot stops in the lane in order to locate and retrieve the item from the shelf. A second scenario is when a robot wishes to change directions or change lanes. These and other stoppage scenarios have the potential of creating collision or deadlock between two or more robots moving to or past the same space.

To prevent these collisions, some embodiments further coordinate the movement of the different robots with the synchronization primitives. The synchronization primitives allow robots to reserve different portions of three dimensional space to ensure unconflicted entry into that space. This three dimensional space reservation creates a movement precedence between two or more robots. The movement precedence provides a first robot that successfully reserves conflicted space with a synchronization primitive priority to enter that conflicted space, and causes at least a second robot that was unable to reserve the conflicted space to defer to the first robot until the first robot has moved through the conflicted space and subsequently released the synchronization primitive reserving the conflicted space.

Some embodiments modify robot operation so that each robot uses synchronization primitives to reserve space in front, behind, and to its side when moving or coming to a stop. The synchronization primitives prevent entry of other robots into the reserved space and further prevent the reserving robot from being deadlocked in the entered space.

If a robot is unable to reserve space with a synchronization primitive, the robot is prevented from moving into that space. The robot can either temporarily pause its movement or navigate around synchronization primitives established by other robots. In some embodiments, navigating around a synchronization primitive involves a robot temporarily entering a third lane to move past the synchronization primitive before reentering the first lane or the second lane in which the robot was previously in.

The synchronization primitives can be defined with a set of spatial coordinates when used to reserve space for current or future movements. These synchronization primitives can also be defined with other parameters. For example, a robot may define a time or duration for a synchronization primitive when establishing the synchronization primitive. The time or duration notifies other robots as to how long the synchronization primitive will exist.

Figure 2:
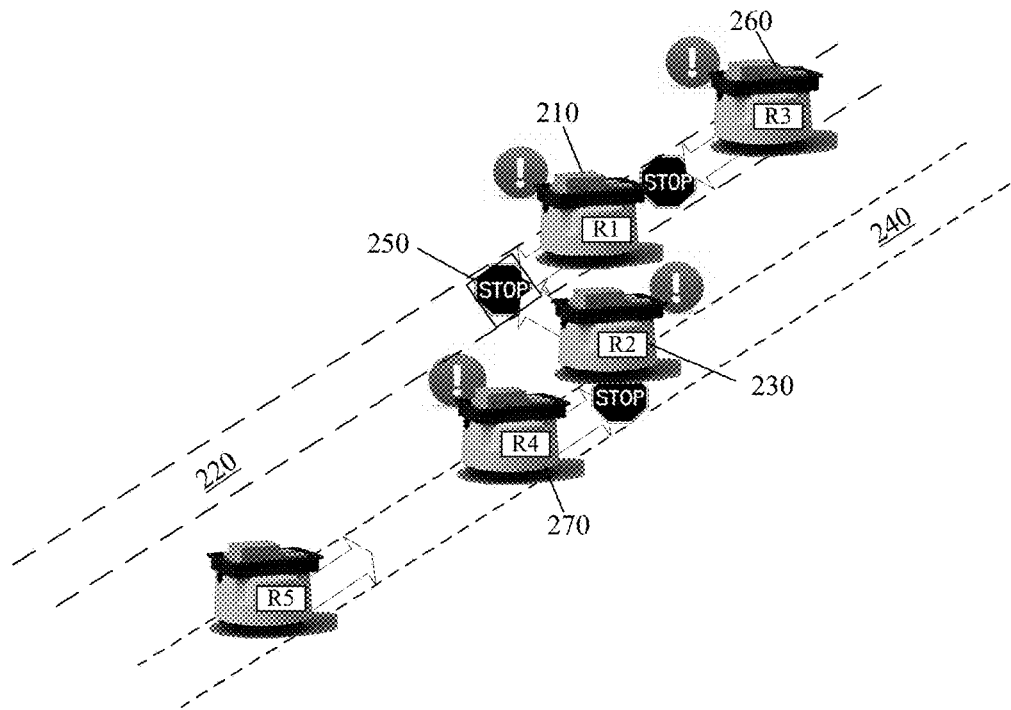
FIG. 2 conceptually illustrates a deadlock that is formed between two robots moving without the use of the synchronization primitives of some embodiments.

As noted above, the movement precedence established by the synchronization primitives enhances the coordinated movements of robots in lanes by preventing collisions and deadlocks. FIG. 2 conceptually illustrates a deadlock that is formed between two robots moving without the use of the synchronization primitives of some embodiments and FIG. 3 illustrates using the synchronization primitives to prevent the deadlock from forming in accordance with some embodiments.

In FIG. 2, a first robot 210 attempts to move in a first direction down a first lane 220 and a second robot 230 attempts to move from a second lane 240 into the first lane 220 directly in front of the first robot 210. Both robots 210 and 230 attempt to enter the conflicted space 250 and both robots 210 and 230 come to a stop to avoid colliding with one another. Without any coordination of movements, both robots 210 and 230 may wait for the other to move out of the way. Other robots 260 and 270 can then move in behind the first and second robots 210 and 230 blocking them in and creating a deadlock. Alternatively, the first and second robots 210 and 230 may try and find an alternate route to the conflicted space only to create potential collisions and deadlocks with the other robots.

Figure 3:
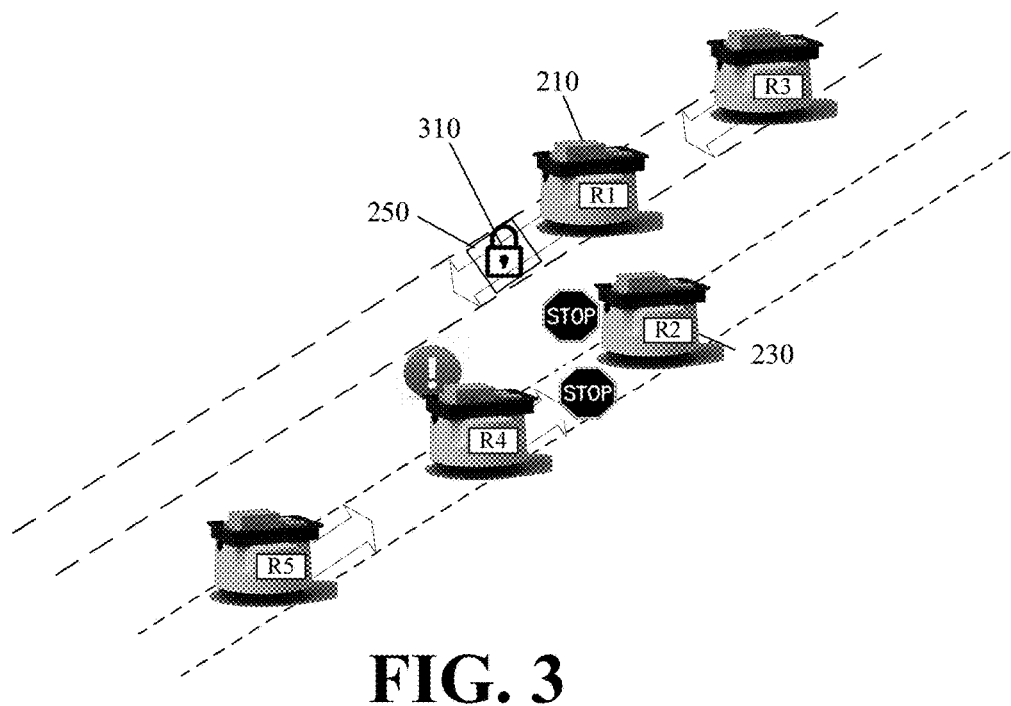
FIG. 3 illustrates using the synchronization primitives to prevent the deadlock from forming in accordance with some embodiments.

FIG. 3 resolves the conflict by using the synchronization primitive to reserve the space resource for one of the robots with other robots deferring movement into the space resource until they are able to reserve the space resource in kind with a synchronization primitive of their own. The first robot 210 reserves the conflicted space with a synchronization primitive 310 and is provided precedence to move into the conflicted space 250. The second robot 230 cannot establish its own synchronization primitive to reserve the conflicted space 250 and must defer to the first robot 210 by waiting until the first robot 210 removes the synchronization primitive 310. The first robot 210 moves through the conflicted space 250, removes the synchronization primitive 310, thereby allowing the second robot 230 to reserve the space for itself before moving into it.

In some embodiments, the formation of the lanes results from modified robot operation that causes the robots to keep different set distances when travelling in different directions. This modified robot operation results from adapting robot sensors to detect distance and from adapting robot operation to modify its distance in accordance with the direction the robot intends to move.

The robots can use a variety of sensors to detect and correct the distance for an intended lane. Visual (e.g., light, laser, imaging, LiDAR, etc.), acoustic, global position system (GPS), or other beacon or signal based sensors can be used by the robots for the lane specific distance detection and correction.

Figure 4:
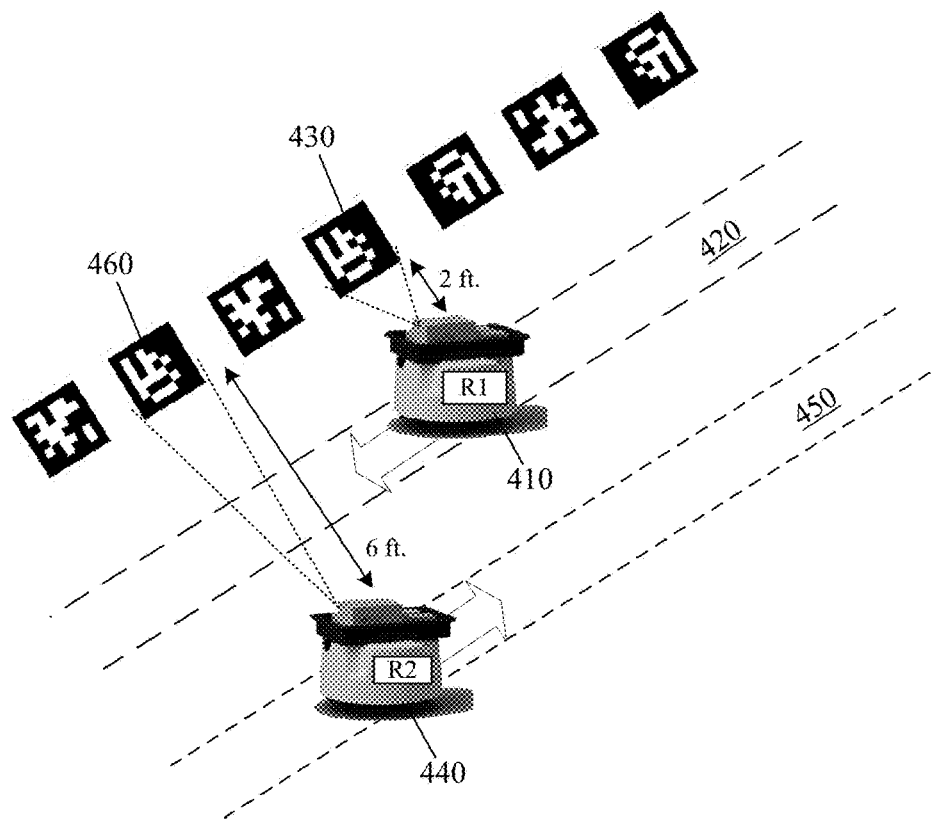
FIG. 4 illustrates the modified robot operation of some embodiments for keeping robots in at least first and second lanes.

FIG. 4 illustrates the modified robot operation of some embodiments for keeping robots in at least first and second lanes. The figure presents a first robot 410 operating in a first lane 420 because the first robot 410 maintains a first distance from a first reference point 430 that is about perpendicular to the first robot's 410 directional movement. The figure also presents a second robot 440 operating in a second lane 450 because the second robot 440 maintains a greater second distance from a second reference point 460 that is about perpendicular to the second robot's 440 direction movement.

Some embodiments place the references points about a common vertical plane to aid the robots in the recognizing the reference points. The common vertical plane provides the robots with a static location at which to position their cameras when moving down the lanes.

The reference points include one or more features with which a robot can gauge its distance relative to each reference point. The reference points can also be encoded with information that upon decoding conveys more than a point of reference. The encoded information can identify a nearby object, a location, a measure, size, and cost as some examples. With the encoded information, the reference points can serve a dual purpose in establishing the lanes and conveying location information to the robots. Using the location information embedded in the reference points, the robots can navigate within a space without global positioning system (GPS) or other positioning systems.

The reference points of FIG. 4 can be any robot recognizable object. The reference points can be parallel to the lanes or arbitrarily placed about the lanes. The reference points can be visual markers or signal emitting beacons. As such, the reference points need not be visually defined.

Marker defined reference points can be formed by unique arrangements of patterns, lines, shapes, and other symbols or visual identifiers. In some embodiments, the markers are fiducials. Fiducials of different resolutions can be used depending on the application.

Figure 5:
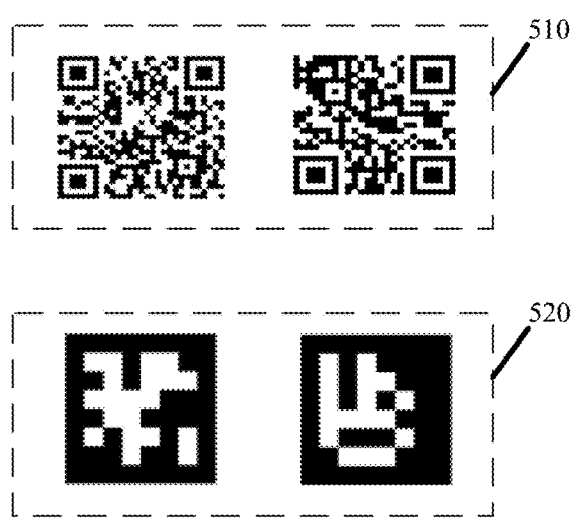
FIG. 5 presents an exemplary subset of high resolution markers and subset of low resolution markers in accordance with some embodiments.

High resolution fiducials, such as barcodes and Quick Response (QR) codes, comprise a more tightly condensed set of visual information than low resolution fiducials, such as April tags or April codes. Other fiducials that can be used as robotic navigational markers include ArUco markers and ARTag markers as some examples. FIG. 5 presents an exemplary subset of high resolution markers 510 and subset of low resolution markers 520 in accordance with some embodiments.

Lower resolution markers are preferred because robots can decipher the lower resolution markers in less time, with less visual accuracy, and from greater distances than high resolution markers. This is primarily due to the fewer number of features and larger size of each feature in the low resolution markers 520 relative to the high resolution markers 510. The larger size of the low resolution marker features also allows the robots to correct for any blurriness that enters into an image or scan of a low resolution marker via software without affecting the decoding thereof. Consequently, the robots can take less precise images of the low resolution markers 520, wherein the lower precision can be due to the robots being transitory or further away from the marker while taking the image. Stated differently, the robots are able to scan and decipher such markers without halting or otherwise interrupting their movement in any of the defined lanes. The ability for robots to scan the low resolution markers while transitory and from greater distance facilitates the usage of the same set of markers to establish a first lane in which robots move at a first distance from the markers and a second lane in which robots move at a larger second distance from the markers.

Figure 6:
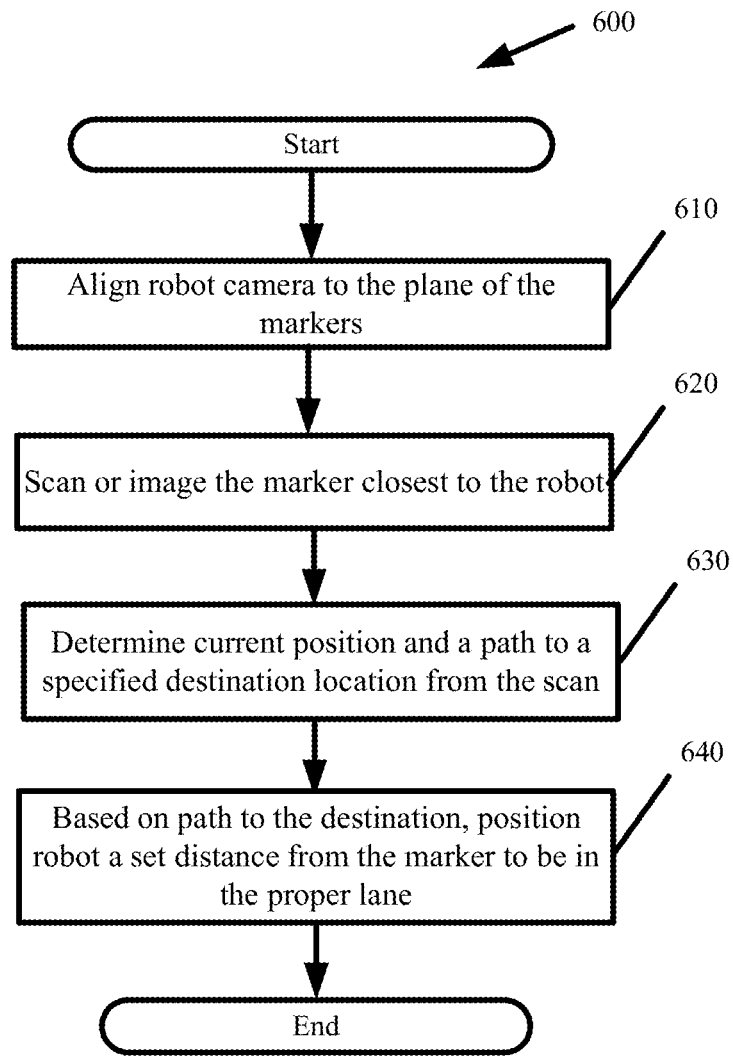
FIG. 6 presents a process detailing the modified robot operation of some embodiments for coordinating the movement of a robot in the different lanes using the markers.

FIG. 6 presents a process 600 detailing the modified robot operation of some embodiments for coordinating the movement of a robot in the different lanes using the markers. The process 600 commences after a robot receives an instruction to move to a destination location. The destination location can be specified with one or more markers or can be specified with a set of coordinates or other information that can be decoded from the markers in some embodiments.

The process starts by aligning (at 610) the robot's camera to the plane of the markers so that the markers fall within the camera's field of view. As noted above, the robot can be programmed with a specific height or plane at which to locate the markers. The robot can also use an internal compass to determine its position relative to the markers in order to determine what direction to turn the camera so that it faces the markers. For example, the markers may be to the right of the robot when the robot is facing a first direction and the markers may be to the left of the robot when the robot is facing an opposite second direction.

The process scans or images (at 620) the marker closest to the robot. In some embodiments, the robot scans the marker that is about perpendicular to the robot's current position or the direction in which the robot last moved.

The process determines (at 630) its current position and a path to the specified destination location from the scan. In some embodiments, the robot determines its current position from decoding location information from the adjacent marker. In some embodiments, the robot determines a path to the destination based on the location information decoded from the adjacent marker and the manner in which the location information changes in markers on either side of the adjacent marker. The robot can also be programmed with a map that generally identifies where its current position is relative to the intended destination with the robot then using the markers to specifically locate the destination.

The determined path identifies the direction the robot must move in order to reach the destination. The direction of movement determines what lane the robot must enter. Accordingly, the process next involves positioning (at 640) a set distance from the marker so that the robot enters the proper lane for moving in the direction of the destination. For instance, if moving in a first direction, the process positions the robot a first distance from the marker. If moving in an opposite second direction, the process positions the robot a second distance from the marker. The robot operation for moving within the lanes using the synchronization primitives is described below with reference to FIG. 8.

Figure 7:
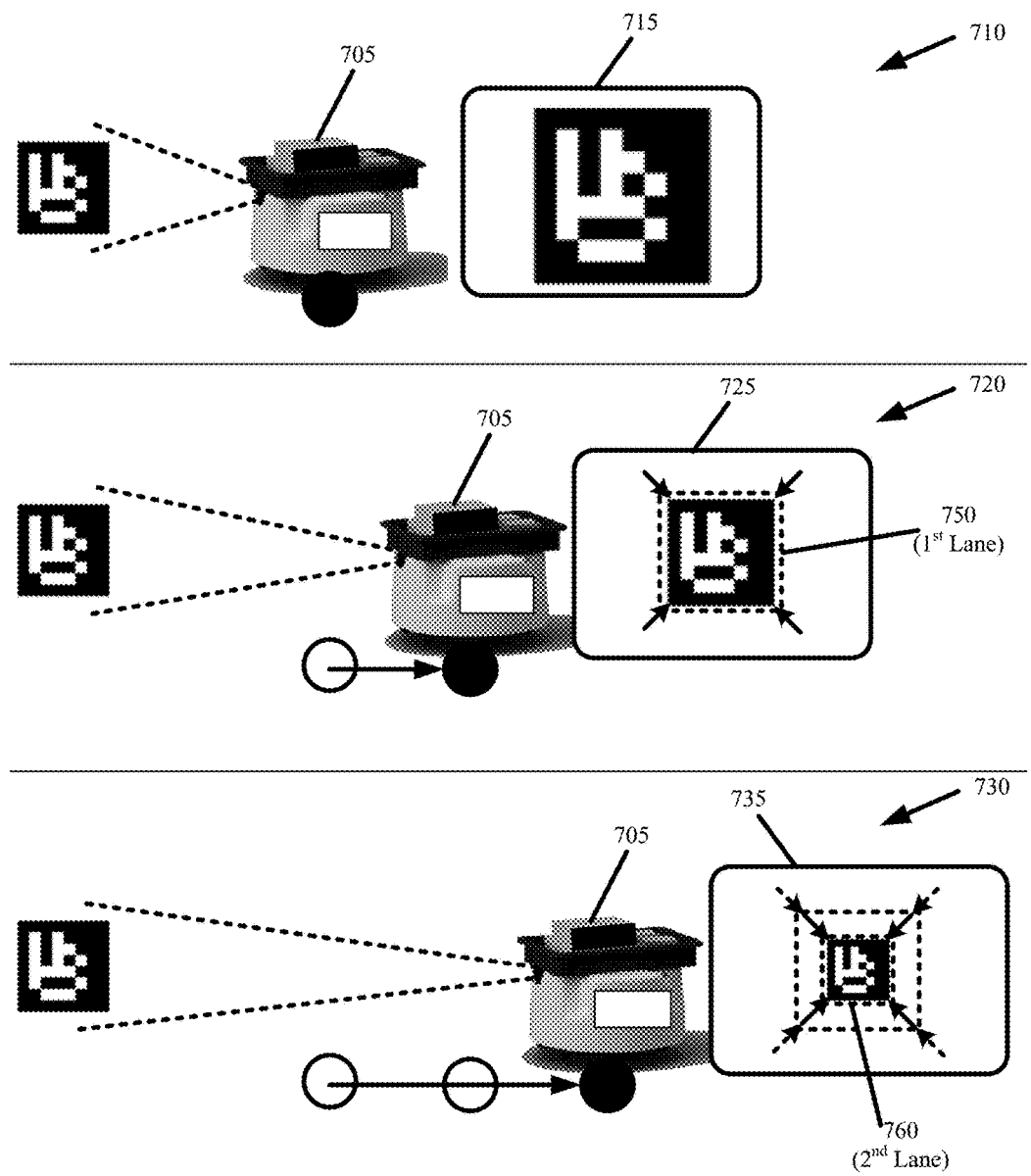
FIG. 7 conceptually illustrates the modified operation by which a robot positions itself in a correct lane based on the intended direction of robot movement.

FIG. 7 conceptually illustrates the modified operation by which a robot 705 positions itself in a correct lane based on the intended direction of robot movement. At stage 710, the figure illustrates the first imaging 715 of a marker that is closest to the robot 705. Based on the size of the marker and/or features of the marker appearing in the robot's 705 image, the robot 705 determines its distance relative to the marker.

At stage 720, the robot 705 performs a first set of positional adjustments 750 to move away from the marker. The robot takes and processes images of the marker while moving and stops its movements when the marker or marker features marker appear in a second image 725 at a defined first size 750. When the marker or marker features appear at the defined first size 750 in the robot's camera, the robot is in the first lane.

At stage 730, the robot performs a second set of positional adjustments to move further away from the marker. The robot again takes and process images of the marker while moving and stops its movements when the marker or marker features appear in a third image 735 at a defined second size 760. When the marker or marker features appear at the defined second size 760 in the robot's camera, the robot is in the second lane.

In some embodiments, the robot determines its distance from the marker based on a transform computation of the marker image. In some embodiments, the robot determines its distance from the marker by comparing the appearance of the marker to a first reference image for the first lane and a second reference image for the second lane.

These same techniques can be applied to coordinate robot movements without reference to visual markers of any kind. In some embodiments, the robot's sensory array includes a depth perception camera or a range finding sensor. The robot turns this sensor to face a wall or other object running along the robot's intended movement path. The direction with which to turn the sensor may depend on the robot's intended movement direction. For instance, the robot may turn the sensor west when traveling north and turn the sensor east when traveling south. The robot can then adjust its distance and enter the correct lane based on the distance measurements obtained from the sensor. One or more light sensors, acoustic sensors, and other beacon or signal detection sensors can be used in the same manner to obtain distance measurements and enter the robot in a correct lane for movement within a site.

Although coordinating robot movement in the lanes includes modifying robot operation, it should be evident that no changes are needed to the robot's sensory array. Different sensors can be adapted to perform the global navigational methodology for autonomously coordinating the movement of multiple robots in different lanes.

Figure 8:
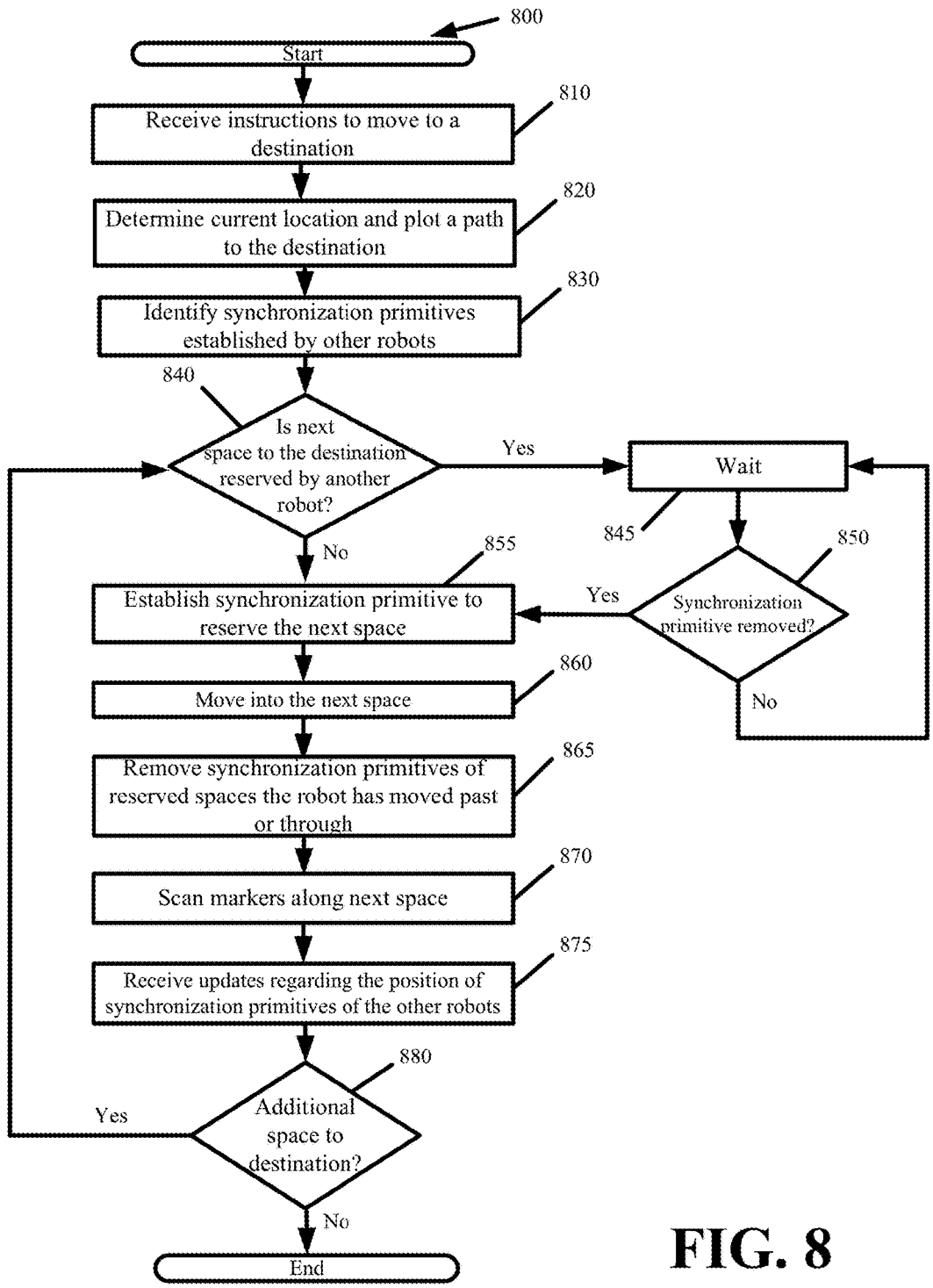
FIG. 8 presents a process detailing the modified robot operation of some embodiments for coordinating the movement of a robot with synchronization primitives.

FIG. 8 presents a process 800 detailing the modified robot operation of some embodiments for coordinating the movement of a robot with synchronization primitives. The process 800 commences with the robot receiving (at 810) instructions to move to a destination. The robot determines (at 820) its current location and plots a path to the destination. The robot current position can be determined by scanning one or more markers that are closest to the robot.

Before the robot can begin moving, the robot identifies (at 830) the synchronization primitives for space resources established by other robots. In a centralized model, the robot may receive the synchronization primitives from a coordinator that tracks synchronization primitives established by all robots. In a distributed model, the robot may receive synchronization primitives established by other robots based on peer-to-peer messaging exchanged between the robots. Based on the synchronization primitives for different space resources established by the other robots, the robot checks (at 840) if the space into which it intends to move is reserved by another robot.

When another robot has the space reserved, the robot waits (at 845) until the synchronization primitive for that space resource is removed (at 850). In some embodiments, the robot is permitted to perform an evasive maneuver to travel around another robot's space resource synchronization primitive. The evasive maneuver may include temporarily entering a third lane to bypass the reserved region of space.

When another robot has not reserved the space, the robot establishes (at 855) its own synchronization primitive to reserve the space before moving (at 860) into the space. The robot also removes (at 865) any synchronization primitives it had previously established to reserve space it has moved past or through. In some embodiments, the synchronization primitives are set with expiration times so that the robot does not have to explicitly remove the synchronization primitives, the robot can simply let a synchronization primitive expire without reestablishing the synchronization primitive. In some embodiments, the establishment step at 855 involves the robot establishing synchronization primitives to reserve some amount of space behind the robot and to its side. These additional space resource reservations prevent other robots from blocking in the robot in case the robot needs to reverse or change course. Establishing the synchronization primitives involves updating the other robots as to the existence and position of the robot's locks. As the robot moves, the robot scans (at 870) the markers along its path and receives (at 875) updates regarding the position of space resource synchronization primitives of the other robots operating in the same space. The robot scans the markers to stay within the correct lane. Information decoded from scanning the markers can also direct the robot's movement to the intended destination including notifying the robot when it should turn, adjust its directional movement, or stop when the robot has reached the destination.

Figure 9:
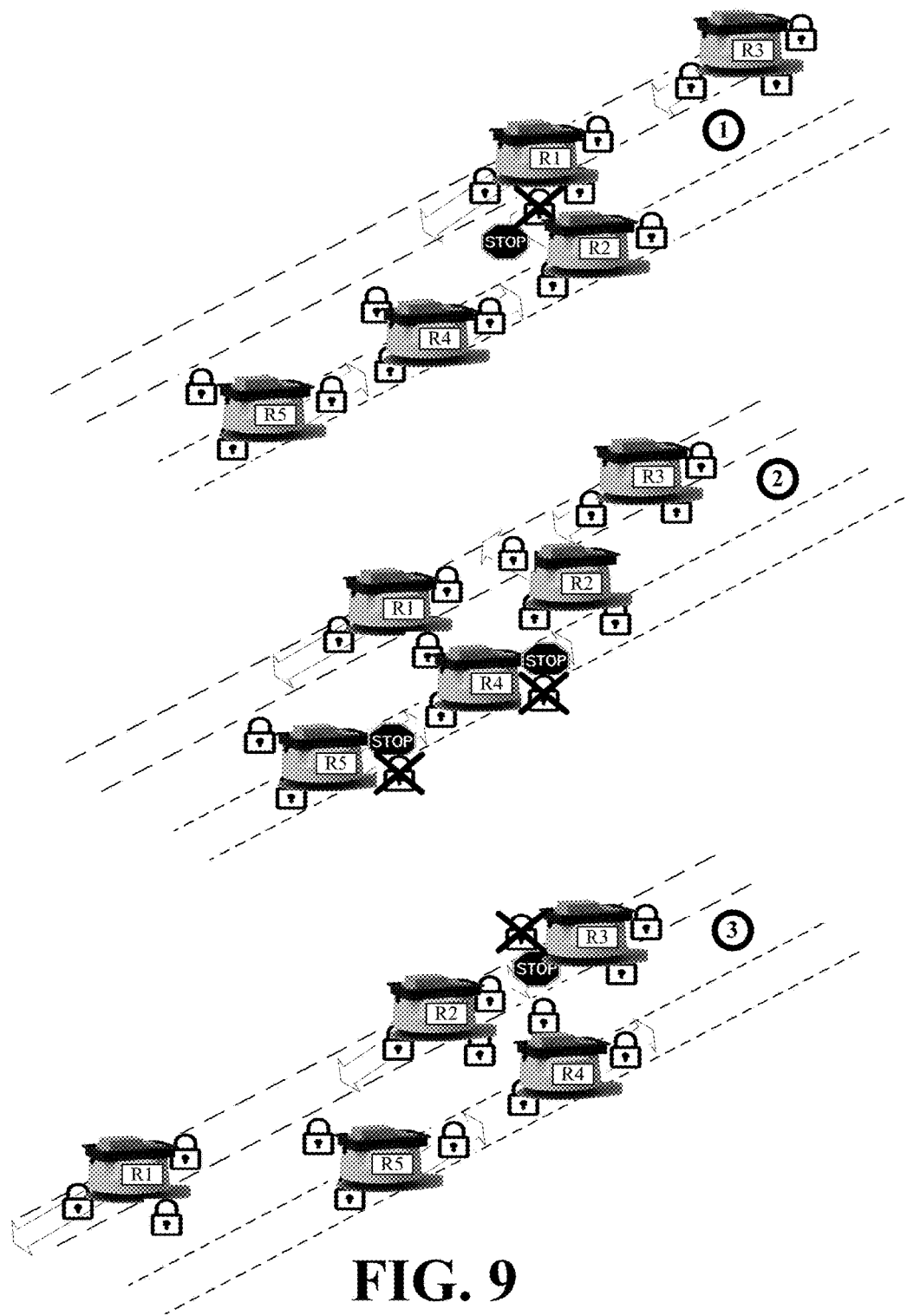
FIG. 9 presents robot movements at different times to illustrate the robots' usage of the lanes and the space resource synchronization primitives to autonomously coordinate and control their movements in accordance with some embodiments.

The robot continues in this manner until the robot arrives (at 880) at the destination location. If the robot has not yet reached its intended destination, the robot reverts back to 840. Once the robot arrives at its intended destination, the process ends. The robot can then perform a set of actions at the destination before restarting process 800 and moving to another location. In some embodiments, the robot establishes synchronization primitives for different resources needed to perform the set of actions at the destination. Some actions an order fulfillment robot takes upon reaching a destination include retrieving an item for transport or depositing a transported item. FIG. 9 presents robot movements at different times to illustrate the robots' usage of the lanes and the space resource synchronization primitives to autonomously coordinate and control their movements in accordance with some embodiments.

In these figures, each synchronization primitive represents a portion of reserved space that allows a reserving robot access to the space and prevents other robots from entering the space. The reserved space includes portions of the lanes in which the robots move, but can include other space in which the robots can enter when performing actions outside of the lanes.

The amount of space represented by a synchronization primitive is configurable. Synchronization primitives can be defined using any units of measure. In one embodiment, a synchronization primitive reserves an amount of space needed for a robot to come to a stop. In another embodiment, a synchronization primitive reserves 5 feet of space around the robot.

In some embodiments, a synchronization primitive is defined by a set of coordinates or by one or more of the markers or fiducials adjacent to the space. Other identifiers and beaconing can also be used. For example, radio-frequency (RF) tags can be placed along the lanes with each tag having a different identifier. Robots establish the synchronization primitives by reserving one or more of the RF tag identifiers.

The above examples simplify resource reservation by focusing on the single resource of three-dimensional space as a robot goes about performing a task. However, task completion will normally require establishing several different synchronization primitives to reserve different resources associated with completing the task.

Figure 10:
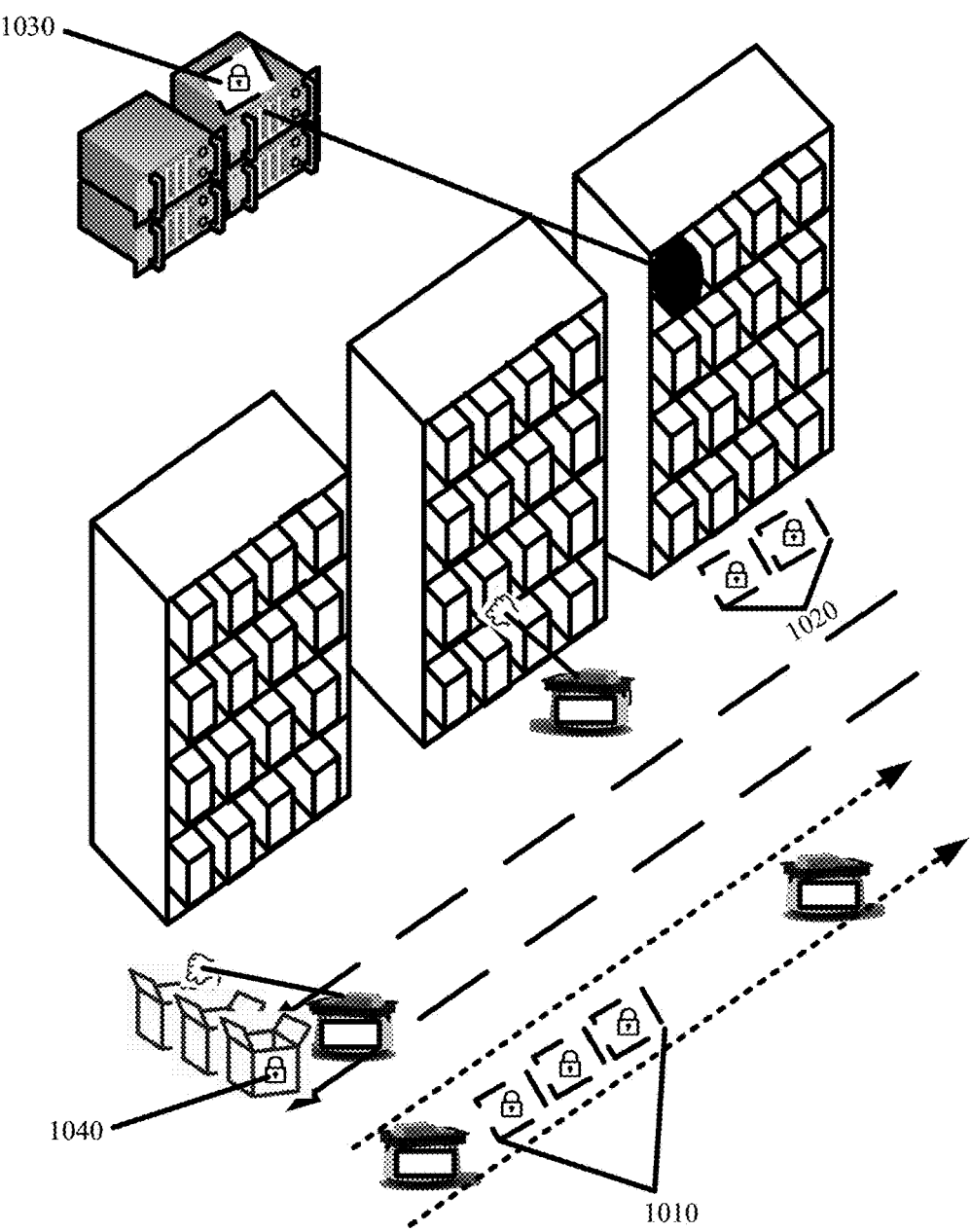
FIG. 10 conceptually illustrates a robot reserving multiple resources in performance of a task.

FIG. 10 conceptually illustrates a robot 1005 reserving multiple resources in performance of a task. The task involves the robot 1005 fulfilling a customer order by retrieving an ordered item from a storage shelf. To complete this task, the robot 1005 reserves four different sets of resources.

The robot 1005 establishes a first set of synchronization primitives 1010 to reserve space into which the robot immediately moves in order to head towards the storage shelf. The robot 1005 establishes a second set of synchronization primitives 1020 to reserve space near the storage shelf. This ensures that the robot 1005 does not travel to the storage shelf simply to wait for another robot to release access to the storage shelf. The robot 1005 establishes a third set of synchronization primitives 1030 to reserve computational resources from a remote computing cluster, wherein the robot 1005 relies on the computational resources to process robot sensor information and identify the correct item from other items on the storage shelf. The robot 1005 establishes a fourth set of synchronization primitives 1040 to package the item for delivery to the customer.

Some space in between the space reserved through first and second sets of synchronization primitives 1010 and 1020 may remain unreserved until the robot 1005 nears the unreserved space. This allows other robots access to those resources stops robots from reserving a large amount of resources prior to needing access to those resources.

To further optimize resource availability while still guaranteeing robots access to the resources, some embodiments allow robots to queue synchronization primitives. Queued synchronization primitives are established with a time. The time designates when the resource reservation is to occur. This allows robots to schedule or reserve resources in advance without reserving the resources until they are needed by the robots.

Figure 11:
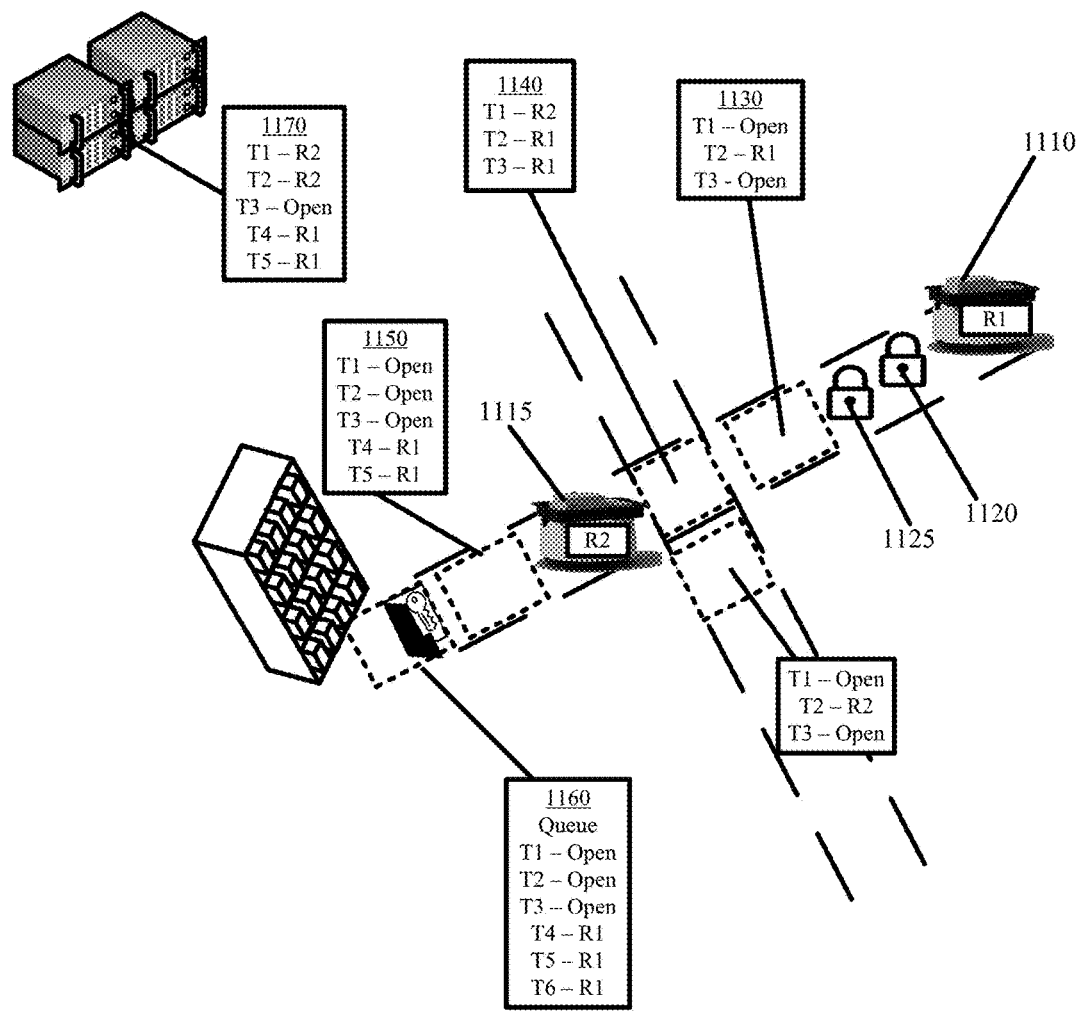
FIG. 11 illustrates synchronization primitive queuing in accordance with some embodiments.

FIG. 11 illustrates synchronization primitive queuing in accordance with some embodiments. The figure illustrates a first robot 1110 and a second robot 1115 establishing different synchronization primitives for immediate and future reservation of different resources needed to complete tasks assigned to robot 1110 and 1115.

The first robot 1110 establishes synchronization primitives 1120 and 1125 to reserve space immediately before the first robot 1110 while en route to a destination. The first robot 1110 also queues synchronization primitives for reserving space resources further along the path to the destination based on the first robot 1110 expected time of arrival at those spaces. The figure illustrates queues 1130, 1140, and 1150 for the different resources the first robot 1110 reserves for future use. The queues 1130, 1140, and 1150 illustrates other robots establishing earlier synchronization primitives for some of the same resources.

The figure also illustrates the first robot 1110 queuing synchronization primitives for access at a security door 1160. The first robot 1110 may require authorization prior to accessing a restricted area secured by the security door 1160. The queuing allows the authorization to occur prior to the first robot's 1110 arrival at the security door 1160, but not so early that the authorization expires.

The figure also illustrates future reservation of part of a remote computing cluster 1170. The queued synchronization primitive for accessing the remote computing cluster 1170 may provide the first robot 1110 with additional processing power to perform processing intensive tasks (e.g., object recognition) once the first robot 1110 arrives at its intended destination. The queuing guarantees that the first robot 1110 can complete its task without waiting for access to needed resources, but without unnecessarily reserving the resources when they are not needed.

Each robot includes a wireless transceiver to directly or indirectly notify other robots of the synchronization primitives established by that robot. Each robot further includes a wireless receiver to receive the synchronization primitives that other robots have established.

In some embodiments, indirect conveyance involves performing synchronization primitive establishment and resource reservation in a centralized manner. Some such embodiments introduce a coordinator. The robots send synchronization primitive establishment requests for the resources to the coordinator. The coordinator centrally manages the reservation of the resources amongst the set of robots by keeping track of established synchronization primitives and queued synchronization primitives. In other words, the robots must reserve a resource from the coordinator before they can access the resource.

The coordinator can be a server formed by one or more machines that wirelessly communicate with the robots. The communications between the coordinator and the robots involves establishing synchronization primitives for different resources, wherein the establishment involves a robot sending a synchronization primitive establishment request for a particular resource to the coordinator and the coordinator responding with either confirmation or rejection. In some embodiments, the synchronization primitive request includes a first identifier identifying the robot submitting the request and a second identifier identifying the resource the robot wants to reserve.

When the requested resource is available at or for the time specified in the robot's request, the coordinator reserves the requested resource at or for the time specified. The coordinator then sends confirmation to the robots. The confirmation instructs the robot that its synchronization primitive was successfully established and the robot has access to the particular resource at or for the time specified in the synchronization primitive establishment request. The coordinator may also set an expiration time for the robot's synchronization primitive. The expiration time may be commensurate with the duration requested by the robot if available or may be less or more depending on access requested by other robots for the same resource.

When the coordinator finds the requested resource as having been reserved by another robot at the requested time, the coordinator rejects the robot's synchronization primitive establishment request. As part of the rejection notification, the coordinator may send the expiration time for the current established synchronization primitive so that the requesting robot can request the resource at that time and/or alter performance of its task list rather than wait idly for the particular resource to be freed.

In addition to the synchronization primitive and resource management, the coordinator can assign tasks for the different robots to perform. This involves instructing the robots on the actions they are to take. In some embodiments, the coordinator optimizes the task assignment prior to assigning the tasks to different robots for execution.

Figure 12:
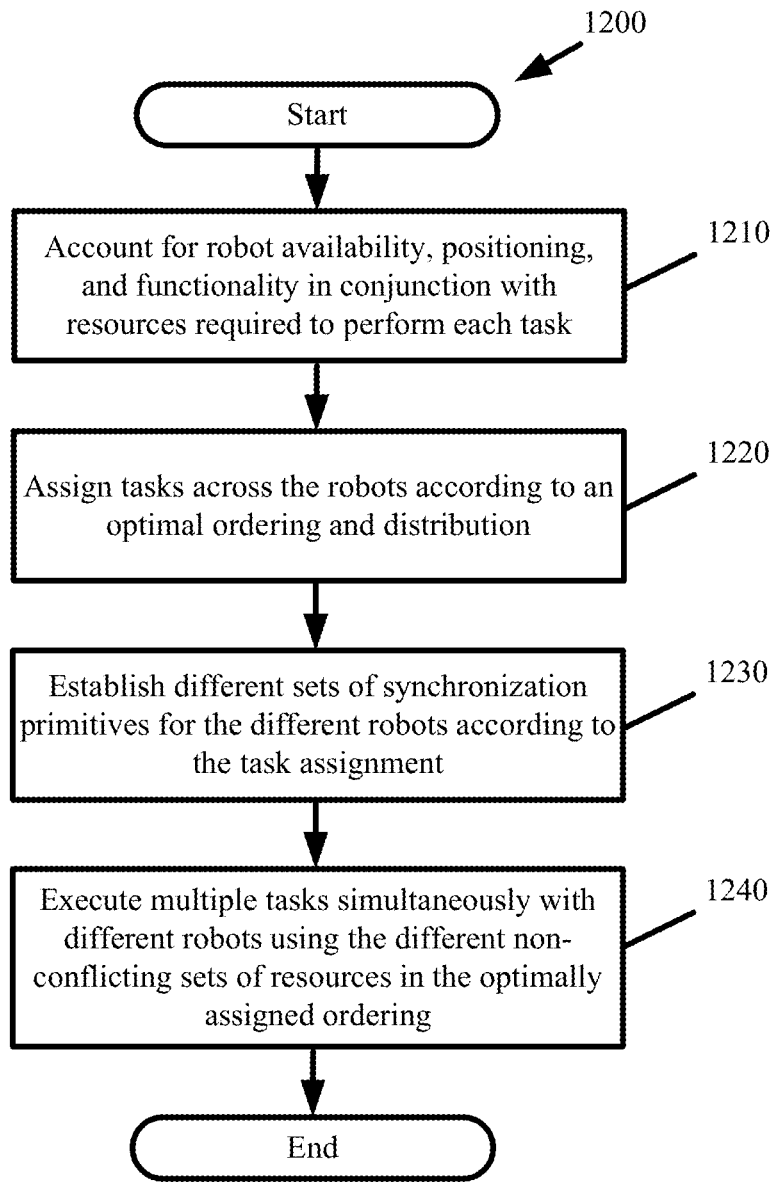
FIG. 12 presents a process for optimizing task execution by a plurality robots using a limited and shared set of resources in accordance with some embodiments.

FIG. 12 presents a process 1200 for optimizing task execution by a plurality robots using a limited and shared set of resources in accordance with some embodiments. Process 1200 involves accounting (at 1210) for the number of robots, current robot positions, available resources, robot functionality or capability, complexity of the tasks, resources required for each task, and other such factors.

From the accounting, the process optimally assigns (at 1220) tasks across the robots. The optimal task assignment is the result of an optimal task ordering and distribution that maximizes the number of simultaneous tasks that can be performed by the robots while minimizing or eliminating the number conflicting resources that two or more robots require in order to simultaneously perform the different tasks.

The process then involves establishing (at 1230) different sets of synchronization primitives for the different robots according to the optimal task assignment. The synchronization primitive establishment provides each of the task assigned robots immediate non-conflicting exclusive access to different sets of resources needed to perform the assigned tasks simultaneously.

The process then concludes with the robots simultaneously executing (at 1240) multiple tasks using the different non-conflicting sets of resources in the optimally assigned ordering. The task assignment optimization nevertheless remains a suboptimal optimization.

Some robots may receive an insufficient amount of resources for a given task. Some robots may perform slower than other robots thereby reserving resources longer than expected. Some robots may experience failures. Some robots may complete a task after one or more unsuccessful attempts.

In these and other scenarios, the robots dynamically adapt and modify operation. The synchronization primitives allow for the robots to work around any unforeseen or unexpected deviations from the optimal assignment. In particular, if one robot was to malfunction or run slow, the other robots can dynamically adjust the resources they access with the synchronization primitives so that one deviation does not necessarily impact performance of the other robots or create a chain effect in which the delay propagates to all robots that subsequently need access to the resource accessed by the delaying robot or further resources access by the delaying robot.

Figure 13:
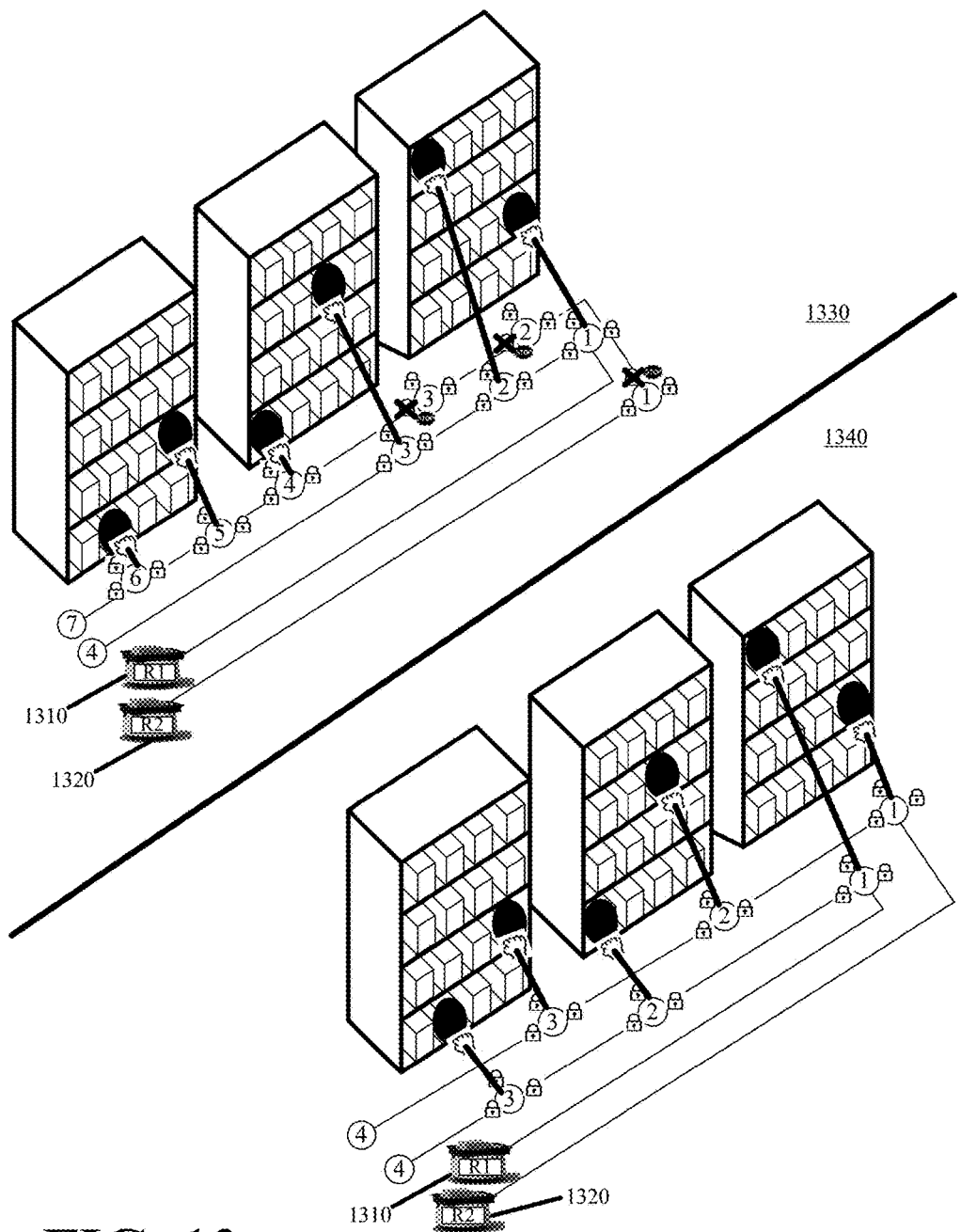
FIG. 13 conceptually illustrates optimizing the movement of multiple robots in accordance with some embodiments.

FIG. 13 conceptually illustrates optimizing the movement of multiple robots in accordance with some embodiments. The figure illustrates two robots 1310 and 1320 and a set of stopping points where the robots 1310 and 1320 are to retrieve different items. Scenario 1330 provides a suboptimal scheduling of the retrieval tasks that would cause the robots 1310 and 1320 to have to wait for one another at different stops. Scenario 1340 provides an optimal schedule in which every other stop is assigned to one of the robots 1310 and 1320. The robots 1310 and 1320 can then move to the stops and perform the tasks without waiting for one another.

The coordinator may issue rules to the robots 1310 and 1320. The rules can set speeds at which the robots travel in the different lanes or when coming upon a synchronization primitive established by another robot. For instance, rather than race to the reserved resource of another robot, stop, and wait for the synchronization primitive to be removed, a robot can reduce its speed until the synchronization primitive is removed and then resume at a faster speed.

Some embodiments perform the synchronization primitive establishment and resource reservation in a decentralized or distributed manner. In some such embodiments, the synchronization primitives are established through peer-to-peer messaging exchanged between the set of robots. From this messaging, robots can independently optimize their task list and perform assigned tasks in the most efficient manner based on the availability of different resources.

Since there is no central coordinator coordinating access to the resources, there is additional complexity involved in the peer-to-peer establishment of the synchronization primitives. In particular, the robots must form a consensus amongst themselves as to which robot is granted access to which resource at any given time.

In some embodiments, a particular robot queries the other robots when attempting to establish a synchronization primitive for reservation of a particular resource. If the other robots are in agreement that there is no conflict, they grant the particular robot access to the requested resource. The particular robot then notifies the other robots that it has established the synchronization primitive with respect to the particular resource, thereby reserving the particular resource at or for a specified time.

The peer-to-peer messaging may be secured by configuring each robot with a private key. The robot signs any messages it sends to other robots using its private key. The other robots can then use one or more public keys to identify the message originator.

Race conditions, conflicting access, or deadlocks can arise if two or more robots attempt to reserve the same resource at or near the same time or when a third party or malfunctioning robot denies other robots access to a particular resource that should otherwise be available. Accordingly, some embodiments provide secure peer-to-peer synchronization primitive establishment through resource blockchains. A blockchain is associated with each accessible resource. The resource blockchain tracks a chronology of events associated with the corresponding resource. From this event chronology, any robot can determine if another robot has established a synchronization primitive or has earlier priority to establish a synchronization primitive for accessing the resource associated with the blockchain.

In some embodiments, a robot writes to the blockchain using a private key that is only known to the robot. The robot can append the blockchain by retrieving a prior hash value and hashing the retrieved value with the robot's own private key. Other robots can use a public key to go back in the blockchain chronology and determine one or more robots with current access rights or priority rights to the resource.

The above embodiments have been described with respect to robots that move across a common plane. These include any robots with wheels, legs, or other means of powered or motorized movement. Other components of the robots include a power source, such as a battery, to provide power for motors or engines that move the wheels, legs, or other means of movement. The components can further include wireless or wired network connectivity, a camera or scanner to image the markers, and a processor to decode the markers, establish the locks, control movements of the robots, and communicate with the coordinator or other robots. U.S. Pat. No. 9,120,622 describes a transitory order fulfillment robot that can be adapted to implement the embodiments presented herein. The contents of U.S. Pat. No. 9,120,622 are incorporated herein by reference.

The embodiments can be adapted for aerial robots or drones that can move across multiple planes. With respect to aerial robots, the lanes can be defined at multiple planes. For example, a first set of markers can be placed at a first height and a second set of markers can be placed at a different second height. The aerial robots can then create lanes at either height based on keeping a set distance from the first set of markers when moving at the first height and keeping a set distance from the second set of markers when moving at the second height. The aerial robots will continue to use the locks, although the locks are defined with an additional parameter to specify a plane.

We claim:

1. A method comprising:
   assigning a task to a first autonomous robot from a plurality of autonomous robots operating within a common environment;
   determining at least a first resource from a plurality of resources required by the first autonomous robot in completing said task;
   identifying a first identifier that identifies the first resource;
   generating a second identifier, that uniquely identifies the first autonomous robot, using a unique key of the first autonomous robot;
   generating a synchronization primitive based on the first identifier and the second identifier;
   securing exclusive access to the first resource by the first autonomous robot with the synchronization primitive, wherein said securing prevents other autonomous robots from the plurality of autonomous robots from accessing the first resource, and wherein said securing comprises:
      signaling the synchronization primitive to the plurality of autonomous robots with the synchronization primitive associating the second identifier, that identifies the first autonomous robot, to the first identifier, that identifies the first resource; and
      receiving, in response to said signaling, a message, from each robot of the other autonomous robots, granting the first autonomous robot said exclusive access to the first resource;
   accessing the first resource with the first autonomous robot in response to said securing.

2. The method of claim 1, wherein said unique key is a private key of the first autonomous robot, and wherein the other autonomous robots identify the first autonomous robot as an originator of the synchronization primitive using a corresponding public key for said private key.

3. The method of claim 1, wherein said signaling comprises wirelessly transmitting the synchronization primitive from the first autonomous robot to each of the other autonomous robots.

4. The method of claim 1 further comprising removing the synchronization primitive from the first resource after said accessing the first resource with the first autonomous robot.

5. The method of claim 4 further comprising reserving exclusive access to the first resource for a different second autonomous robot of the plurality of autonomous robots, wherein said reserving comprises generating a different second synchronization primitive with the first identifier and a different third identifier using a unique key of the second autonomous robot that differs from the unique key of the first autonomous robot, and signaling the second synchronization primitive to the plurality of autonomous robots with the second synchronization primitive associating the third identifier, that identifies the second autonomous robot, to the first identifier, that identifies the first resource.

6. The method of claim 5 further comprising accessing the first resource with the second autonomous robot in performance of a different second task assigned to the second autonomous robot.

7. The method of claim 1 further comprising securing by the first autonomous robot, exclusive access to a different second resource adjacent to the first resource within the common environment prior to said accessing, wherein securing exclusive access to the second resource comprises:
   identifying a third identifier that is used to reserve access to the second resource;
   generating a different second synchronization primitive based on the third identifier and the second identifier; and
   signaling the second synchronization primitive to the plurality of autonomous robots with the second synchronization primitive associating the second identifier, that identifies the first autonomous robot, to the third identifier, that identifies the second resource.

8. The method of claim 1, wherein said generating the synchronization primitive further comprises associating an expiration time as a third identifier of the synchronization primitive, said expiration time setting a limited time or duration providing the first autonomous robot with exclusive access to the first resource.

9. The method of claim 1, wherein said task is a first task, the method further comprising:
   assigning a second task to the first autonomous robot prior to the first autonomous robot completing the first task;
   tracking by the first autonomous robot, a plurality of synchronization primitives established by other autonomous robots of the plurality of autonomous robots, said plurality of synchronization primitives providing the other autonomous robots exclusive access to different sets of resources and preventing the first autonomous robot from accessing said sets of resources;
   determining in response to said tracking and the plurality of synchronization primitives, availability of the plurality of resources with which the first autonomous robot completes the first task and availability of a different plurality of resources with which the first autonomous robot completes the second task;
   reordering execution of the second task before the first task in response to the availability of the second set of resources enabling the first autonomous robot to execute the second task faster than the availability of the first set of resources enables execution of the first task; and
   accessing the second set of resources with the first autonomous robot while executing the second task.

10. The method of claim 1, wherein said securing further comprises obtaining at the first autonomous robot in response to said signaling, consensus from other autonomous robots of the plurality of autonomous robots granting the first autonomous robot exclusive access to the first resource.

11. The method of claim 1, wherein the task involves moving the first autonomous robot in a particular direction along a path from a current location to a destination location.

12. The method of claim 11, wherein said accessing comprises directing a camera of the first autonomous robot towards a particular reference point of a plurality of reference points disposed along said path.

13. The method of claim 12, wherein said accessing further comprises adjusting a distance of the first autonomous robot from the particular reference point based on the particular direction, wherein said adjusting comprises moving the first autonomous robot a first distance from the particular reference point in response to moving a first direction along the path and moving the first autonomous robot a different second distance from the particular reference point in response to moving an opposite second direction along the path.

14. The method of claim 12, wherein said accessing further comprises adjusting a distance of the first autonomous robot from the particular reference point based on the particular direction, wherein said adjusting comprises moving the first autonomous robot away from the particular reference point until the particular reference point appears with a first size in said camera in response to moving a first direction along the path, and moving the first autonomous robot away from the particular reference point until the particular reference point appears with a different second size in said camera in response to moving an opposite second direction along the path.

15. The method of claim 1 further comprising:
   identifying the first resource to be a first space along a path;
   associating a first synchronization primitive of the first autonomous robot with the first space on a front side of the first autonomous robot prior to the first autonomous robot moving into the first space on the front side;
   associating a second synchronization primitive of the first autonomous robot with a different second space to a left or right side of the first autonomous robot in traveling to the first space along said path;
   associating a third synchronization primitive of the first autonomous robot with a third space on a back side of the first autonomous robot; and
   moving the first autonomous robot along said path without obstruction from other autonomous robots of the plurality of autonomous robots in response to said first, second, and third synchronization primitives reserving exclusive access to the first, second, and third spaces for the first autonomous robot while preventing the other autonomous robots from accessing the first, second, and third spaces.

16. A particular autonomous robot from a plurality of autonomous robots operating within a common environment, the particular autonomous robot comprising:
   a motorized base;
   a wireless radio;
   a non-transitory computer-readable medium storing a set of processor-executable instructions; and
   one or more processors configured to execute the set of processor-executable instructions, wherein executing the set of processor-executable instructions causes the one or more processors to:
      receive a task via the wireless radio;
      determine at least a first resource from a plurality of resources required by the particular autonomous robot to complete said task;
      identify a first identifier that identifies the first resource;
      generate a second identifier that uniquely identifies the particular autonomous robot using a unique key of the autonomous robot;
      generate a synchronization primitive based on the first identifier and the second identifier;
      secure exclusive access to the first resource with the synchronization primitive, wherein said securing prevents other autonomous robots from the plurality of autonomous robots from accessing the first resource, and wherein said securing comprises processor-executable instructions to:
         signal the synchronization primitive to the other autonomous robots with the synchronization primitive associating the second identifier, that identifies the particular autonomous robot, to the first identifier, that identifies the first resource; and
         receive, in response to said signaling, a message, from each robot of the other autonomous robots, granting the first autonomous robot said exclusive access to the first resource;
      access, via activation of the motorized base, the first resource in response to said securing.

17. A method comprising:
   assigning a first task to a first autonomous robot from a plurality of autonomous robots operating within a common environment;
   assigning a second task to the first autonomous robot prior to the first autonomous robot completing the first task;
   determining a first plurality of resources required by the first autonomous robot in completing said first task;
   tracking by the first autonomous robot, a plurality of synchronization primitives established by other autonomous robots of the plurality of autonomous robots, said plurality of synchronization primitives providing the other autonomous robots exclusive access to different sets of resources and preventing the first autonomous robot from accessing said sets of resources;
   determining in response to said tracking and the plurality of synchronization primitives, availability of the first plurality of resources with which the first autonomous robot completes the first task, and availability of a different second plurality of resources with which the first autonomous robot completes the second task;
   reordering execution of the second task before the first task in response to the availability of the second plurality of resources enabling the first autonomous robot to execute the second task faster than the availability of the first set of resources enables execution of the first task; and
   securing exclusive access to the second plurality of resources by the first autonomous robot while preventing other autonomous robots from the plurality of autonomous robots from accessing the second plurality of resources, wherein said securing comprises (i) generating an identifier using a unique key of the first autonomous robot and (ii) signaling said exclusive access to the plurality of autonomous robots through a write operation with which the first autonomous robot associates said identifier to each resource of the second plurality of resources; and accessing the second plurality of resources with the first autonomous robot in response to said securing.

\* \* \* \* \*